(12) United States Patent
Wittig

(10) Patent No.: US 8,626,843 B2
(45) Date of Patent: Jan. 7, 2014

(54) MASS-COMMUNICATION TEMPLATES FOR COMMUNICATION-SCENARIOS

(75) Inventor: Frank Wittig, Walldorf (DE)

(73) Assignee: SAP AG, Walldorf (DE)

( * ) Notice: Subject to any disclaimer, the term of this patent is extended or adjusted under 35 U.S.C. 154(b) by 655 days.

(21) Appl. No.: 12/569,297

(22) Filed: Sep. 29, 2009

(65) Prior Publication Data

US 2011/0078586 A1 Mar. 31, 2011

(51) Int. Cl.
*G06F 15/16* (2006.01)

(52) U.S. Cl.
USPC .......................................................... 709/206

(58) Field of Classification Search
None
See application file for complete search history.

(56) References Cited

U.S. PATENT DOCUMENTS

| | | | |
|---|---|---|---|
| 2005/0027781 A1* | 2/2005 | Curry et al. ................... | 709/200 |
| 2006/0161505 A1 | 7/2006 | Sattler et al. | |
| 2007/0094593 A1 | 4/2007 | Wagner et al. | |
| 2009/0089654 A1 | 4/2009 | Wittig et al. | |
| 2009/0089664 A1 | 4/2009 | Wagner et al. | |
| 2009/0089696 A1* | 4/2009 | Miller et al. ................... | 715/771 |
| 2009/0144447 A1 | 6/2009 | Wittig et al. | |
| 2009/0164921 A1 | 6/2009 | Wagner et al. | |

OTHER PUBLICATIONS

"Office.com Help and How-to: Use mail merge to distribute merged e-mail messages," Office 2003 help file, released 2002.*
SAP CRM 7.0 Release Highlights "What's New in SAP CRM 7.0?" (2007) 36 pages.

* cited by examiner

*Primary Examiner* — Scott Christensen
(74) *Attorney, Agent, or Firm* — Fish and Richardson P.C.

(57) ABSTRACT

A selection of a communication scenario of multiple communication scenarios is received. Availability of content placeholders associated with the selected communication scenario is presented. A selection of a content placeholder from the content placeholders associated with the selected communication scenario is received. Based on the received selection of the content placeholder associated with the communication scenario, a mass-communication template including the content placeholder is generated. The mass-communication template is accessed to generate a first electronic communication. The first electronic communication is sent with first content based on a first state of a communication variable specified by the content placeholder of the mass-communication template. The mass-communication template is accessed to generate a second electronic communication. The second electronic communication is sent with second content based on a second state of the communication variable specified by the content placeholder of the mass-communication template.

20 Claims, 5 Drawing Sheets

Mass-Communication Template
110 — 111

To: [e-mail of each account # in database] — 112
Subject: New Statement
Body:
[first name of account #], please find your statement dated for [current date]. — 113

[[if account # is delinquent] "Your account is past due with a balance of [balance of account #]] — 114

Process Execution
120 — Run-time

E-mail 1
130 — 131

To: john.doe@example.com — 132
Subject: New Statement
Body: — 133
John, please find your statement dated for August 3, 2009.

E-mail 2
140 — 141

To: janes1234@generic.gov — 142
Subject: New Statement
Body: — 143
Jane, please find your statement dated for August 3, 2009.

Your account is past due with a balance of $1,400. — 144

MASS-COMMUNICATION TEMPLATES FOR COMMUNICATION-SCENARIOS

TECHNICAL FIELD

This document relates to the generation and use of mass-communication templates for sending electronic communication in various communication-scenarios.

BACKGROUND

Businesses or other entities may include a large group of contacts with whom they send e-mails or other electronic communications. In order to send e-mails, one or more human operators of the business can manually create an e-mail and add relevant content for each contact. While this method of sending e-mails allows for flexibility, it also can require significant human effort, particularly for situations with hundreds or thousands of recipients. In another method, the one or more operators can create a single e-mail and add generally relevant content for multiple recipients. This method for sending e-mails minimizes the needs for operator effort at the cost of recipient-specific content flexibility.

SUMMARY

In one aspect, a computer-implemented method includes receiving a selection of a communication scenario of multiple communication scenarios. Each of the communication scenarios is associated with content placeholders. The method also includes presenting availability of the content placeholders associated with the selected communication scenario and receiving a selection of a content placeholder from the content placeholders associated with the selected communication scenario. The content placeholder is configured to include content in electronic communications based on a state of a specified communication variable. The method further includes generating, based on the received selection of the content placeholder associated with the communication scenario, a mass-communication template including the content placeholder.

The method additionally includes accessing the mass-communication template to generate a first electronic communication and sending the first electronic communication with first content based on a first state of the communication variable specified by the content placeholder of the mass-communication template. Moreover, the method includes accessing the mass-communication template to generate a second electronic communication and sending the second electronic communication with second content based on a second state of the communication variable specified by the content placeholder of the mass-communication template.

This and other implementations can optionally include one or more of the following features, which also may optionally be in any combination. For example, receiving the selection of the communication scenario can include receiving input from a user through a graphical user interface to select one of multiple present communications scenarios presented to the user. Presenting availability of the content placeholders associated with the selected communication scenario can include presenting availability of one or more content placeholders which are not associated with other communication scenarios. The selected content placeholder can include instructions for including a greeting which is customized for the selected communication scenario in generated electronic communications. The greeting can include a first portion which is predetermined for all communications generated with the mass-communication template and a second portion which is conditional based on the specified communication variable.

The method can additionally include accessing a database to determine the state of the communication variable. The communications variable can be an account number of the intended recipient of the electronic communication, accessing the database to determine the state of the communication variable can include accessing the database to determined the account number of the intended recipient, and the first content can be a first account number and the second content is a second account number.

The method can also include receiving a selection of a second content placeholder from the content placeholders associated with the selected communication scenario, wherein the second content placeholder is configured to conditionally include third content in electronic communications based on a state of a second specified communication variable, and wherein the generated mass-communication template includes the second content placeholder. Also, the method can include determining, based on the second content placeholder, that the second communication variable is in a first state, and including third content in the first electronic communication based on the determination that the second communication variable is in the first state, wherein sending the first electronic communication includes sending the first electronic communication with the first and the third content. Finally, the method can include determining, based on the second content placeholder, that the second communication variable is in a second state and determining not to include third content in the second electronic communication based on the determination that the second communication variable is in the second state.

In another aspect, a computer-implemented method includes receiving a selection of a communication scenario of multiple communication scenarios. Each of the communication scenarios is associated with content placeholders. The method also includes presenting availability of the content placeholders associated with the selected communication scenario and receiving a selection of a content placeholder from the content placeholders associated with the selected communication scenario. The content placeholder is configured to include content in electronic communications based on a state of a specified communication variable. The method further includes generating, based on the received selection of the content placeholder associated with the communication scenario, a mass-communication template including the content placeholder. The method additionally includes accessing the mass-communication template to generate a first electronic communication and identifying the content placeholder as included in the mass-communication template accessed to generate the first electronic communication.

Also, the method includes determining, based on the identified content placeholder, that the communication variable is in a first state and including first content in the first electronic communication based on the determination that the communication variable is in the first state. Further, the method includes sending the first electronic communication with the first content and accessing the mass-communication template to generate a second electronic communication. Moreover, the method includes identifying the content placeholder as included in the mass-communication template accessed to generate the second electronic communication and determining, based on the identified content placeholder, that the communication variable is in a second state. Finally, the method includes including second content in the second electronic communication based on the determination that the communication variable is in the second state and sending the second electronic communication with the second content.

The method may include additional features. For example, receiving the selection of the communication scenario can include receiving input from a user through a graphical user interface to select one of multiple present communications scenarios presented to the user. Presenting availability of the content placeholders associated with the selected communication scenario can include presenting availability of one or more content placeholders which are not associated with other communication scenarios. The selected content placeholder can include instructions for including a greeting which is customized for the selected communication scenario in generated electronic communications. The method can also include accessing a database to determine the state of the communication variable. The communications variable can be an account number of the intended recipient of the electronic communication, accessing the database to determine the state of the communication variable can include accessing the database to determined the account number of the intended recipient, and the first content can be a first account number and the second content is a second account number.

The method can additionally include receiving a selection of a second content placeholder from the content placeholders associated with the selected communication scenario, wherein the second content placeholder is configured to conditionally include third content in electronic communications based on a state of a second specified communication variable, and wherein the generated mass-communication template includes the second content placeholder. The method can further include identifying the second content placeholder as included in the mass-communication template accessed to generate the first electronic communication, determining, based on the second content placeholder, that the second communication variable is in a first state, and including third content in the first electronic communication based on the determination that the second communication variable is in the first state, wherein sending the first electronic communication includes sending the first electronic communication with the first and the third content. The method can finally include identifying the second content placeholder as included in the mass-communication template accessed to generate the second electronic communication, determining, based on the second content placeholder, that the second communication variable is in a second state, and determining not to include third content in the second electronic communication based on the determination that the second communication variable is in the second state.

In another aspect, a computer program product tangibly embodied in a computer-readable storage medium includes instructions that when executed by a processor perform a method including receiving a selection of a communication scenario of multiple communication scenarios. Each of the communication scenarios is associated with content placeholders. The method includes presenting availability of the content placeholders associated with the selected communication scenario and receiving a selection of a content placeholder from the content placeholders associated with the selected communication scenario. The content placeholder is configured to include content in electronic communications based on a state of a specified communication variable.

The method also includes generating, based on the received selection of the content placeholder associated with the communication scenario, a mass-communication template including the content placeholder. The method further includes accessing the mass-communication template to generate a first electronic communication and sending the first electronic communication with first content based on a first state of the communication variable specified by the content placeholder of the mass-communication template. Moreover, the method includes accessing the mass-communication template to generate a second electronic communication; and sending the first electronic communication with first content based on a first state of the communication variable specified by the content placeholder of the mass-communication template.

The details of one or more implementations are set forth in the accompanying drawings and the description below. Other features will be apparent from the description, the drawings, and the claims.

DESCRIPTION OF DRAWINGS

FIG. 1 is a diagram of an example of how a mass-communication template can be used to generate multiple unique e-mails.

Like reference symbols in the various drawings indicate like elements.

DETAILED DESCRIPTION

Figure 2:
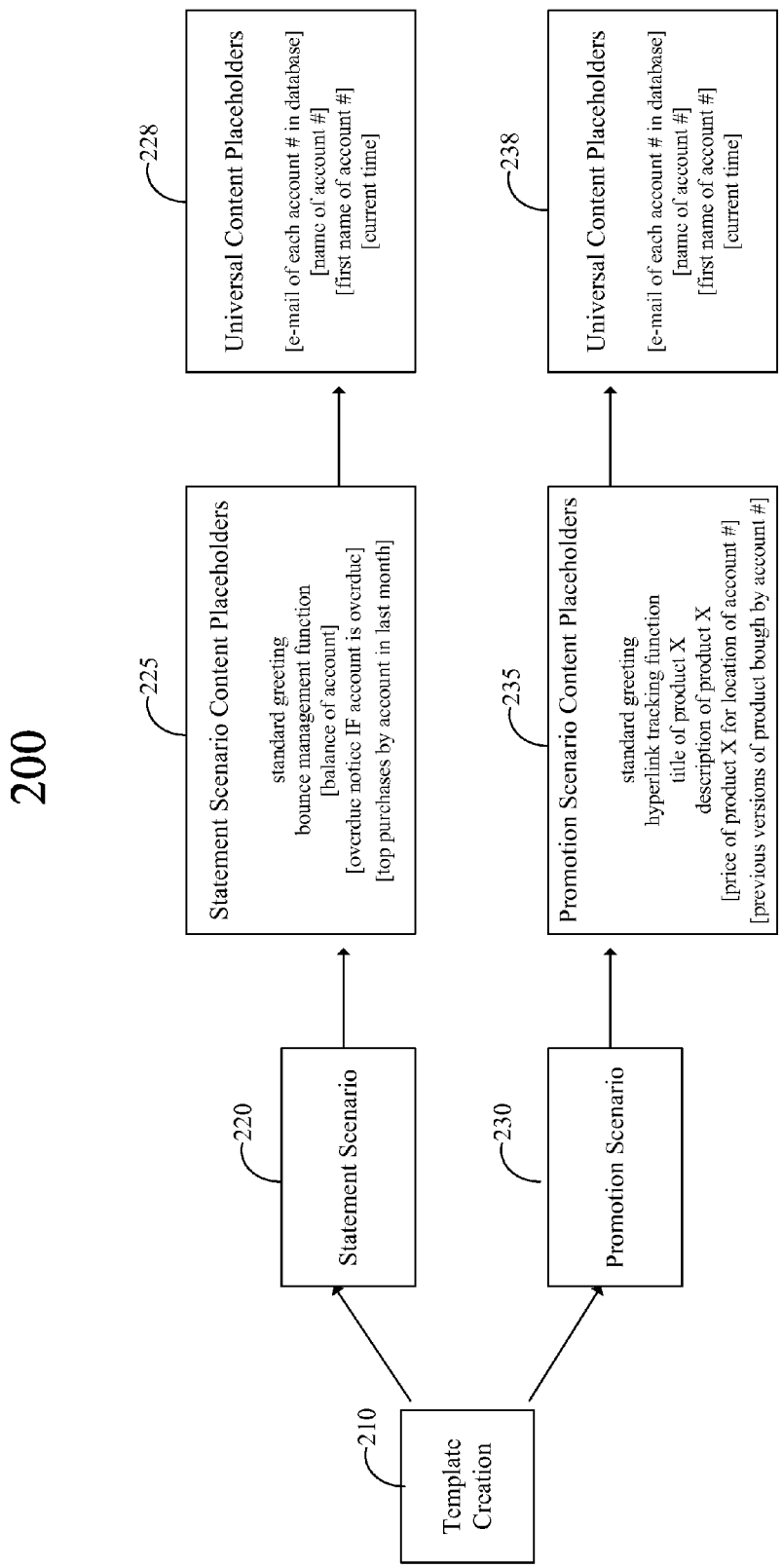
FIG. 2 is a diagram of an example of how content placeholders can be used with different communication-scenarios in creating a mass-communication template.

An organization wishing to send a customized e-mail to a large number of users can create a mass-communication template. The mass-communication template includes a set of instructions that can later be used to generate multiple e-mails in an automated fashion. For example, the instructions of the mass-communication template can instruct a processor to create multiple e-mails and to create content for each of the e-mails without requiring a human operator to instruct the processor to create each e-mail and to populate each e-mail.

Moreover, the instructions of the mass-communication template can include instructions in the form of a content placeholder to populate the created e-mails with static content and dynamic content. Static content is content that is to be similarly included in all e-mails. This may include text for an e-mail body, a subject line, graphics, or other information. For example, a content placeholder can include static content for a common greeting of "Please find your latest statement below." Dynamic content is content that will only be included in some e-mails or is included differently or customized for some or all e-mails.

The dynamic content may be created or customized at the time of e-mail generation based on instructions and pre-defined criteria included in the content placeholder. In particular, the content placeholder can include instructions that indicate how content is to be generated or criteria to be considered in generating content. The instructions can enable the use of various personalization features when creating content of e-mails. For example, the instructions can include dynamic link generation and tracking, personalized hyperlinks, and multi-mime e-mails. The criteria may further specify content variables that vary between e-mails to be considered in generating content, such as the identity of the recipient or the location of the recipient. Accordingly, by using a content placeholder in a mass-communication template, a single mass-communication template can be used to create multiple e-mails sharing common static content but each with unique dynamic content created as the e-mails are created.

The criteria of a content placeholder can point to stored information with instructions for how to retrieve the information and incorporate it into an e-mail. For example, a content placeholder for name retrieval includes a pointer to an information database storing user names in a table with corresponding e-mail address. The name-retrieval content placeholder instructs a processor to, for each e-mail, retrieve the username in the information database corresponding to the e-mail address of the given e-mail and to insert the retrieved username in the e-mail being generated at a particular location in the body of the e-mail. Thus, the name retrieval content placeholder facilitates the inclusion of a customized greeting in each e-mail.

The criteria of a content placeholder can enable similar functionality with respect to generation of hyperlinks used in link tracking. In particular, each hyperlink can be uniquely tailored based on recipient-specific criteria, such as, recipient account name or number. For example, the criteria of a content placeholder can indicate instructions for creating a hyperlink to be included with each e-mail which is configured to enable e-mail tracking based on the recipient account number. Therefore, the content placeholder can customize each hyperlink such that when an e-mail recipient activities the hyperlink, the system sending the e-mail can be made aware of the activation.

Moreover, the content placeholder can be used to create content providing functionality and need not be content viewable to the recipient. For example, content created by the content placeholder can enable e-mail tracking. In one implementation, a content placeholder is used to insert customized read receipts and includes criteria of user account numbers. In particular, the read receipt created by the content placeholder of each e-mail is uniquely tailored to indicate a recipient user account number. The read receipts with the user account number enable various types of e-mail tracking.

FIG. 1 is a diagram 100 of how a mass-communication template 110 can be used to generate multiple unique e-mails. In the diagram 100, a mass-communication template 110 is processed during run-time execution 120 to create a first e-mail 130 and a second e-mail 140 with content differing from the first e-mail 130. The diagram 100 only illustrates two generated e-mails for brevity. The mass-communication template 110 may be used to generate thousands of e-mails with some recipients receiving identical e-mails. Although not shown, the mass-communication template 110 can be configured to be used to generate multiple forms of electronic communication. For example, in some implementations, the mass-communication template 110 is used to generate both e-mails and short message service (SMS) messages at run-time execution 120.

In this example, the mass-communication template 110 includes a content placeholder for the recipient address 111, a content placeholder for the subject 112, a content placeholder for the greeting 113 and content placeholders for the body 114. After generation, the mass-communication template with the content placeholders 111-114 can be stored for later execution. Thereafter, a run-time execution 120 processes the instructions of the mass-communication template to create e-mails. In particular, one or more processors carrying out the instructions during run-time execution 120 create a first e-mail 130 with static content which is predetermined and identified by the mass-communication and dynamic content which is determined at the time of run-time execution 120. The processors also create a second e-mail 140 with the same static content and with different dynamic content which is also determined at the time of run-time execution 120. The number of e-mails and identity of the recipients may be determined by the instructions of the mass-communication template or by other instructions considered during run-time execution 120.

The content placeholder for the recipient address 111 can be used to specify the number of e-mails to be generated and/or the recipient addresses of the e-mails. In this example, the content placeholder for the recipient address 111 points to a database of account holders. The content placeholder for the recipient address 111 further includes instruction on how to use the information in the database. For example, the further instructions can specify that an e-mail is to be created for each account number listed in the database and with the recipient address being the corresponding e-mail address of each account number as listed in the database. During run-time execution 120, the processor may find two accounts in the account database and generate a first e-mail 130 with a recipient address of john.doe@example.com 131 and a second e-mail 140 with a recipient address of janes1234@generic.gov 141.

The content placeholder for the subject 112 can be used to populate the subject line and, in this example, includes only the static content of "New Statement." Therefore, the e-mails 130 and 140 are identically populated with "New Statement" in their respective subject lines. The content placeholder for the greeting 113 includes a combination of static and dynamic content. For example, the content placeholder for the greeting 113 instructs the processor to determine the first name of the account number of the recipient and the current date. Thereafter, the processor creates the greeting with the static content of ", please find the statement dated for"

between the dynamic content of the name and date. In this example, both the first and second e-mails 130 and 140 are sent on the same date. As such, the first e-mail 130 has a greeting 133 of "John, please find your statement dated for Aug. 3, 2009." and the second e-mail 140 has a greeting 143 of "Jane, please find your statement dated for Aug. 3, 2009."

The content placeholder of the body 114 can include static and dynamic content for conditional insertion in e-mails. For example, while the other content placeholders 111-113 may result in content being included in generated e-mails, the content place holder of the body 114 can be configured to instruct the processor to include content in some e-mail but not in other e-mails according to specified conditions. In this example, the condition of the content placeholder of the body 114 is whether the account of the recipient is delinquent. The condition may further point to a separate database listing a delinquency state of each account number. At run-time execution 120, the processor accesses the separate database and looks up the value of the delinquency state of the account number of the e-mail being generated. In other implementations, the condition may instruct the processor to query another process or computer for an indication of whether the account is delinquent.

If the condition of the content placeholder of the body 114 is met, a combination of static and dynamic content is added to the e-mail. In this example, the account of the recipient of the first e-mail 130 is not delinquent and, therefore, is not populated with content from the content place holder of the body 114. The account of the recipient of second e-mail 140 is delinquent and is populated with a body 144 stating "Your account is past due with a balance of $1,400."

Large enterprises may send out a vast number of e-mails for a specific scenario, such as a monthly statement. In particular, the content placeholders 111-114 in the mass-communication template 110 of FIG. 1 are each examples illustrating functionality used in sending an account statement in such a scenario. E-mails sent in different scenarios may be better configured using different types of content placeholders. In some implementations, the content placeholders used may vary with the scenario of a given mass-mailing.

In order to assist human operators to efficiently create mass-communication templates for a particular mass-mailing, content placeholders can be tailored to a particular scenario and made available for use in creating a mass-communication template for the given scenario. FIG. 2 is a diagram 200 of how content placeholders can be used with different communication-scenarios in creating a mass-communication template.

An operator wishing to send a large number of e-mails for a given situation can first initiate mass-communication template generation 210. Thereafter, the operator is asked to specify the communication scenario which the e-mails will be directed to. The example of FIG. 2 includes two scenarios, a statement scenario 220 and a promotion scenario 230. The statement scenario 220 is directed to mass-mailings that provide statements or other standard account information to account holders. For example, the e-mails 130 and 140 of FIG. 1 are created for sending account holders electronic copies of their statements and are part of a statement scenario 220. The promotion scenario 230 is directed to a mass mailing which promotes a product or service of the sending entity.

By selecting the statement scenario 220, the operator can be provided with statement scenario content placeholders 225. These content placeholders are here tailored for use in mass-communications providing statements to users. The statement scenario content placeholders 225 can include the content placeholders 111-114 of FIG. 1 or other content placeholders. For example, upon selection of the statement scenario 220, the operator is provided with the option to include a standard greeting content placeholder (a static salutation configured for e-mails with statements), a dynamic content placeholder which populates e-mails with the account balance of the recipient, and other content placeholders with varying combinations of static, dynamic, and conditional content tailored to the statement scenario 220. In addition, the statement scenario content placeholders 225 can be provided along with functionality tailored to the statement scenario 220. For example, tracking the successful sending of statements may be particularly important, and, therefore, an e-mail bounce management function may be provided along with the statement scenario content placeholders 225.

By selecting the promotion scenario 230, the operator can be provided with promotion scenario content placeholders 235. These content placeholders are here tailored for use in mass-communications promoting products to users. The promotion scenario content placeholders 235 can include a standard greeting content placeholder (a static salutation configured for e-mails promoting products), a dynamic content placeholder which populates e-mails with the price of a product dependent upon the geographic location of the recipient, and other content placeholders with varying combinations of static, dynamic, and conditional content tailored to the promotion scenario 230. In addition, the promotion scenario content placeholders 235 can be provided along with functionality tailored to the promotion scenario 230. For example, tracking the recipient activation of hyperlinks may be useful in tracking the success of a product promotion, and, therefore, a hyperlink tracking function may be provided along with the promotion scenario content placeholders 235. The hyperlinks created for e-mails by the hyperlink tracking function may be based on recipient account information and customized for each e-mail to allow for tracking.

The operator is also provided with the option to include universal content placeholders 228. Universal content placeholders 228 are generic content placeholders provided for use with any scenario. Either the universal content placeholders 228 or the scenario specific content placeholders can be provided along with various other functionality not directly tied to content viewable by the user. The functionality can include, for example, link tracking, email open rate tracking, contact tracking, bounce management, personalized hyperlinks, and use of multi-mime e-mails. This functionality can be provided generally along with the universal content placeholders 228 or can be customized for a scenario and provided along with the scenario specific content placeholders. By customizing functionality generally provided along with universal content placeholders 228, development effort required for generating new functionality to be provided along with scenario specific content placeholders can be minimized.

After being provided with the content placeholders tailored to the selected scenario and the universal content placeholders, the operator can construct the mass-communication template by selecting content placeholders as desired. The two scenarios shown in FIG. 2 are exemplary. An enterprise may use other scenarios or may create additional scenarios and content placeholders. To create a scenario, an operator specifies the type of scenario and scenario specific content placeholders to be made available when creating a mass-communication template for the new scenario. The operator can also create content placeholders to be used by one or more scenarios by specifying the static, dynamic, or condition content to be included by the content placeholder.

Figure 3:
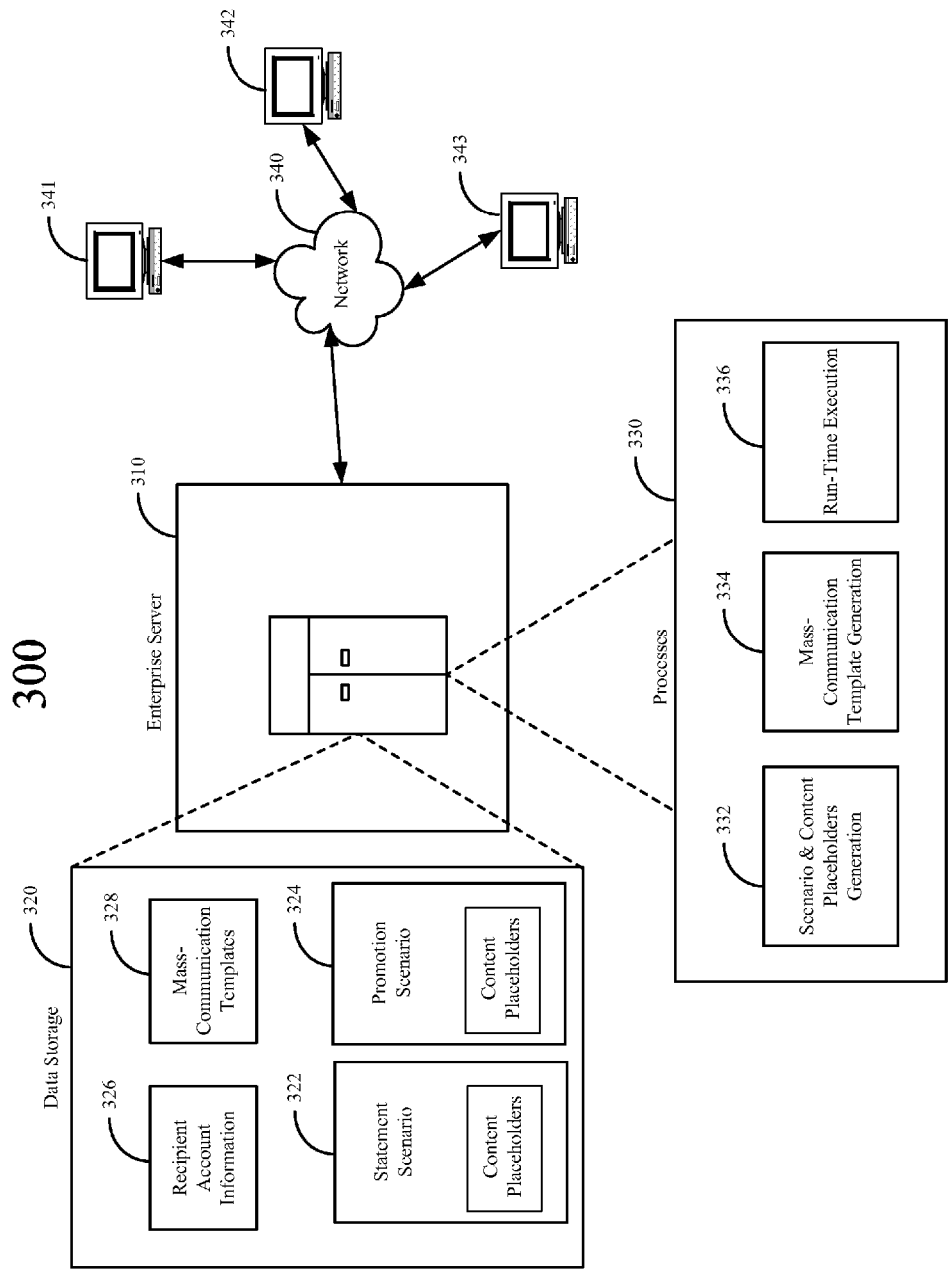
FIG. 3 is an example of a system configured to use mass-communication templates for multiple communication-scenarios.

FIG. 3 shows a system 300 configured to use mass-communication templates for multiple communication-scenarios. The system 300 can represent computers of a large business, government agency, or other enterprise which electronically communicates with a large number of individuals. For simplicity, the system 300 is here shown as including a single computer. In some implementations, the system 300 can represent any number of computers and storage devices at different locations. The enterprise server 310 uses data storage 320 and processes 330 in generating e-mails to be sent over a communications network 340 to the multiple recipient computers 341-343.

The data storage 320 represents one or more storage devices accessible to the enterprise computer server 310 and includes storage of mass-communication templates 328, scenarios for generating mass-communication templates 322 and 324, and information used in generating e-mails with mass-communication templates 326. The storage of scenarios includes storage of the statement scenario 322 stored along with content placeholders of the statement scenario and storage of the promotion scenario 324 along with content placeholders. The storage of scenarios can also include storage of functionality provided with content placeholders not directly tied to placement of content viewable by the recipient of the e-mail. The storage of information used in generating e-mails includes storage of recipient account information 326.

The processes 330 represent programs used in conjunction with mass-communication templates to send e-mails and includes a scenario and content placeholders generation process 332, a mass-communication template generation process 334, and a run-time execution process 336. The scenario and content placeholders generation process 332 can enable a human operator to program a new scenario and customized content placeholders and functionality to be used in generating mass-communication templates with the new scenario. The mass-communication template generation process 334 can enable an operator to select a particular scenario and then use the content placeholders of that scenarios to generate a mass-communication template for a particular communication campaign. The run-time execution process 336 can access a mass-communication template and generate e-mails according to the instructions of content placeholders in the mass-communication template.

Figure 4:
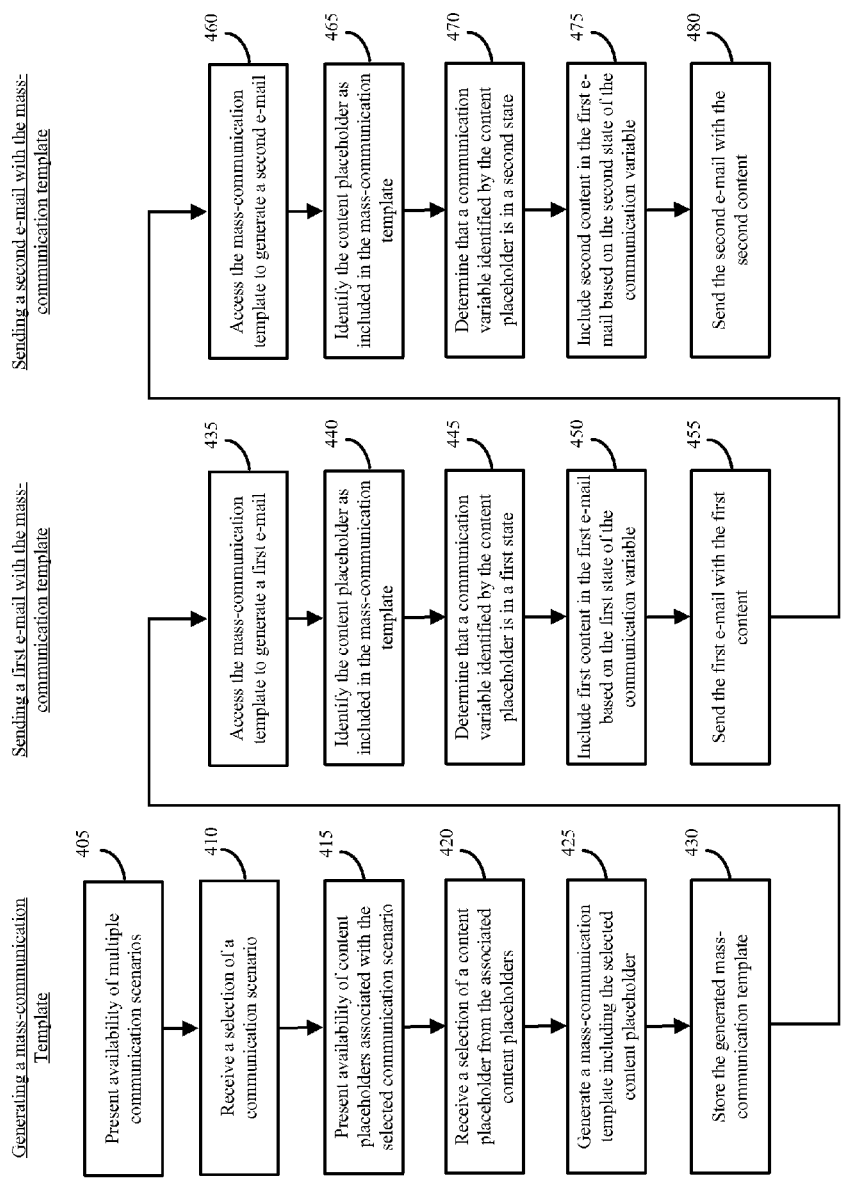
FIG. 4 is a flow chart of an example of a process for sending e-mails for a communication scenario with a mass-communication template.

FIG. 4 is a flow chart of an example of a process 400 for sending e-mails for a communication scenario with a mass-communication template. The process 400 is described below with reference to the system 300 of FIG. 3, and in other implementations the process 400 can be implemented with other systems. The first portion of the process 400 is here directed to the generation of a mass-communication template and begins with the presentation of the availability of multiple communication scenarios through a graphical user interface (GUI) generated by the mass-communication template generation process 334 running on the enterprise server 310 (step 405). For example, the mass-communication template generation process 334 can access the data storage 320 and present the availability of the statement scenario 322 and the promotion scenario 324.

An operator interacting with the GUI can select a particular communication scenario on the GUI and the mass-communication template generation process 334 can receive the selection of the communication scenario (step 410). The mass-communication template generation process 334 can access the selected communication scenario from the data storage 320 to determine the existence of content placeholders associated with the selected communication scenario. Thereafter, the mass-communication template generation process 334 can present the availability of content placeholders associated with the selected communication scenario with the GUI (step 415). The operator selects a particular content placeholder on the GUI and the mass-communication template generation process 334 receives the selection of the content placeholder (step 420).

Steps 415 and 420 can be repeated one or more times to include additional content placeholders. As another example, the user may specify conditional criteria, such as which communications variables are used in generating dynamic content of content placeholders. The mass-communication template generation process 334 can generate a mass-communication template (step 425) and stores the generated mass-communication template in storage of mass-communication templates 328 in the data storage 320.

The second portion of the process 400 is directed to the use of a mass-communication template to send a first e-mail. The run-time execution process 336 running on the enterprise server 310 can access the stored mass-communication template from the database storage 320 to generate the first e-mail (step 435). The content placeholder can be identified as included in the mass-communication template (step 440). The run-time execution process 336 can then determine that a communication variable identified by the content placeholder is in a first state (step 445).

The content placeholder here includes dynamic content that is dependent on a communications variable. For example, the content placeholder can specify the inclusion of a name based on the communication variable of the recipient identity (i.e., the account holder receiving the e-mail). The content placeholder can also include conditions on when or how to include dynamic content. For example, the content placeholder can specify the inclusion of either a first sentence or a second sentence depending upon the communication variable of the recipient location (e.g., if the recipient is in the United States include one sentence but if the recipient is in Europe include another sentence). The run-time execution process 336 includes first content in the first e-mail based on the first state of the communication variable (step 450). Steps 440-450 can be repeated to include content of additional content placeholders in the first e-mail. Thereafter, the run-time execution process 336 sends the first e-mail over the communication network 340 to a first recipient 341.

The third portion of the process 400 is directed to the use of the mass-communication template to send a second e-mail. The run-time execution process 336 running on the enterprise server 310 accesses the stored mass-communication template from the database storage 320 to generate the second e-mail (step 460). The content placeholder is again identified as included in the mass-communication template (step 465). The run-time execution process 336 then determines that the communication variable identified by the content placeholder is in a second state (step 470). Second content is included in the second e-mail based on the second state of the communication variable (step 475). Steps 465-475 can be repeated to include content of additional content placeholders in the second e-mail. Thereafter, the run-time execution process 336 sends the second e-mail over the communication network 340 to a second recipient 341.

Different implementation may include a different process or different steps of the process 400. For example, in some implementations, all e-mails may be sent concurrently after the e-mails are generated. Also, the mass-communication template may only be accessed and the content placeholder may only be identified once when creating multiple e-mails. In addition, in some implementations, the mass-communication template is generated at the time a communication campaign is executed for a single use. Therefore, the mass-communication template may not be stored in or accessed from the database 320.

Figure 5:
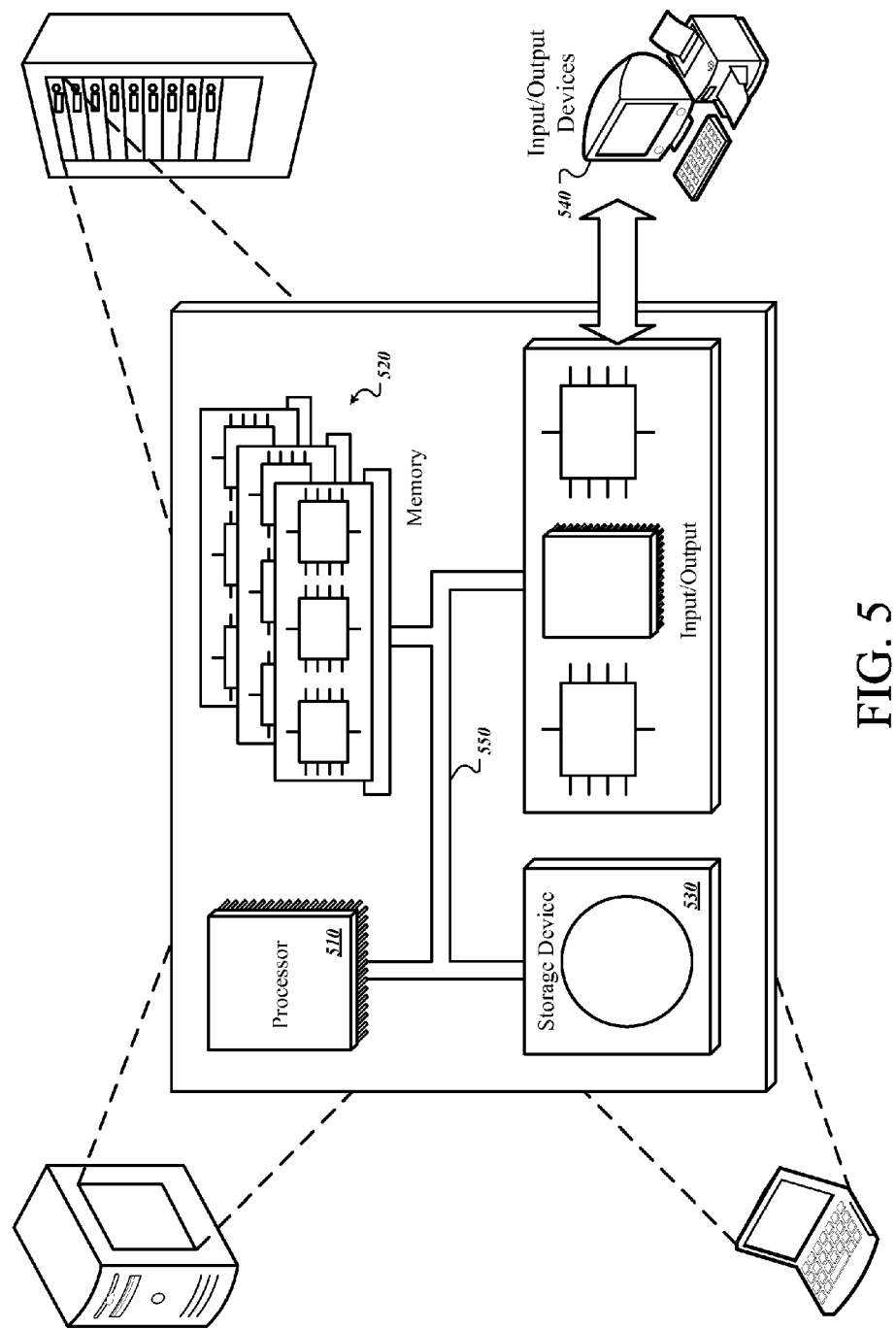
FIG. 5 is a diagram of an example computer system.

For reference with respect to the computer systems shown in and/or used by FIGS. 1-4 discussed above, FIG. 5 is a schematic diagram of a computer system 500. The computer system 500 can be used for the operations described in association with any of the computer-implement methods described previously, according to one implementation. The computer system 500 includes a processor 510, a memory 520, a storage device 530, and an input/output device 540. Each of the components 510, 520, 530, and 540 are interconnected using a system bus 550. The processor 510 is capable of processing instructions for execution within the computer system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer system 500. In one implementation, the memory 520 is a computer-readable medium. In another implementation, the memory 520 is a volatile memory unit. In a further implementation, the memory 520 is a non-volatile memory unit.

The storage device 530 is capable of providing mass storage for the computer system 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer system 500. In one implementation, the input/output device 540 includes a keyboard and/or pointing device. In another implementation, the input/output device 540 includes a display unit for displaying graphical user interfaces.

The features described above can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Finally, while the above description generally focuses on the sending of e-mails, the techniques of the above description can similarly be used to generate and send other forms of electronic communications, such as short message service messages. In particular, condition of content placeholders can specify the creation of an e-mail or another form of electronic message when generating electronic messages according to one or more communication variables, such as format of communication contact information of an account number.

A number of embodiments have been described. Nevertheless, it will be understood that various modifications may be made without departing from the spirit and scope of this disclosure. Accordingly, other embodiments are within the scope of the following claims.

What is claimed is:
1. A computer-implemented method comprising:
setting up an enterprise server configured for performing actions according to communication scenarios, wherein each communication scenario involves using a combination of static, dynamic, and conditional content configured to provide a specific communication functionality between the enterprise server and one or more other entities;
setting up an accountholder communication system in connection with the enterprise server, the accountholder communication system configured to generate electronic messages for multiple accountholders;
presenting, in an environment for creating mass-communication templates for the accountholder communication system, identifiers for multiple communication scenarios to a user;
receiving, by the enterprise server and in the environment, a selection of a communication scenario from among the multiple communication scenarios, wherein each of the communication scenarios is associated with respective content placeholders, wherein at least one of the content placeholders includes instructions for dynamically creating, in an electronic communication, a link tailored to a recipient account number and configured for tracking interaction with the link and notifying the accountholder communication system that sends the electronic communication about activation of the link by a recipient of the respective electronic communication, the tracking including identification of the account number to the accountholder communication system;
presenting, by the enterprise server and in the environment, availability of the content placeholders associated with the selected communication scenario;
receiving, by the enterprise server and in the environment, a selection of a content placeholder from the content placeholders associated with the selected communication scenario, wherein the content placeholder is configured to include content in electronic communications based on a state of a specified communication variable;
generating, by the accountholder communication system in connection with the enterprise server and based on the received selection of the content placeholder associated with the communication scenario, a mass-communication template including the content placeholder;
accessing, by the accountholder communication system, the mass-communication template to generate a first electronic communication;
sending, by the accountholder communication system, the first electronic communication with first content based on a first state of the communication variable specified by the content placeholder of the mass-communication template;
accessing, by the accountholder communication system, the mass-communication template to generate a second electronic communication; and
sending, by the accountholder communication system, the second electronic communication with second content based on a second state of the communication variable specified by the content placeholder of the mass-communication template.

2. The method of claim 1 wherein receiving the selection of the communication scenario includes receiving input from a user through a graphical user interface to select one of multiple present communications scenarios presented to the user.

3. The method of claim 1 wherein presenting availability of the content placeholders associated with the selected communication scenario includes presenting availability of one or more content placeholders which are not associated with other communication scenarios.

4. The method of claim 1 wherein the selected content placeholder includes instructions for including a greeting which is customized for the selected communication scenario in generated electronic communications.

5. The method of claim 4 wherein the greeting includes a first portion which is predetermined for all communications generated with the mass-communication template and a second portion which is conditional based on the specified communication variable.

6. The method of claim 1 further comprising accessing a database to determine the state of the communication variable.

7. The method of claim 6 wherein:
the communications variable is an account number of the intended recipient of the electronic communication;
accessing the database to determine the state of the communication variable includes accessing the database to determine the account number of the intended recipient; and
the first content is a first account number and the second content is a second account number.

8. The method of claim 1 further comprising:
receiving a selection of a second content placeholder from the content placeholders associated with the selected communication scenario,
wherein the second content placeholder is configured to conditionally include third content in electronic communications based on a state of a second specified communication variable,
wherein the generated mass-communication template includes the second content placeholder.

9. The method of claim 8 further comprising:
determining, based on the second content placeholder, that the second communication variable is in a first state; and
including third content in the first electronic communication based on the determination that the second communication variable is in the first state,
wherein sending the first electronic communication includes sending the first electronic communication with the first and the third content.

10. The method of claim 9 further comprising:
determining, based on the second content placeholder, that the second communication variable is in a second state; and
determining not to include third content in the second electronic communication based on the determination that the second communication variable is in the second state.

11. A computer program product tangibly embodied in a non-transitory computer-readable storage medium and comprising instructions that when executed by a processor perform a method comprising:
presenting, in an environment for creating mass-communication templates for the accountholder communication system, identifiers for multiple communication scenarios to a user;
receiving a selection of a communication scenario from among the multiple communication scenarios, wherein each of the communication scenarios is associated with respective content placeholders, wherein at least one of the content placeholders includes instructions for dynamically creating, in an electronic communication, a link tailored to a recipient account number and configured for tracking interaction with the link and notifying the accountholder communication system that sends the electronic communication about activation of the link by a recipient of the respective electronic communication, the tracking including identification of the account number to the accountholder communication system;
presenting availability of the content placeholders associated with the selected communication scenario;
receiving a selection of a content placeholder from the content placeholders associated with the selected communication scenario, wherein the content placeholder is configured to include content in electronic communications based on a state of a specified communication variable;
generating, based on the received selection of the content placeholder associated with the communication scenario, a mass-communication template including the content placeholder;
accessing the mass-communication template to generate a first electronic communication;
sending the first electronic communication with first content based on a first state of the communication variable specified by the content placeholder of the mass-communication template;
accessing the mass-communication template to generate a second electronic communication; and
sending the first electronic communication with first content based on a first state of the communication variable specified by the content placeholder of the mass-communication template.

12. A system comprising:
an enterprise server configured for performing actions according to communication scenarios, wherein each communication scenario involves using a combination of static, dynamic, and conditional content configured to provide a specific communication functionality between the enterprise server and one or more other entities;
an accountholder communication system in connection with the enterprise server, the accountholder communication system configured to generate electronic messages for multiple accountholders; and
an environment for creating mass-communication templates for the accountholder communication system;
wherein the system includes instructions for:

presenting identifiers for multiple communication scenarios to a user;

receiving a selection of a communication scenario from among multiple communication scenarios, wherein each of the communication scenarios is associated with content placeholders, the content placeholders configured to populate electronic messages with static content and dynamic content, the content placeholders configured to be tailored to a particular scenario, wherein at least one of the content placeholders includes instructions for dynamically creating a link in an electronic communication configured for tracking interaction with the link, the link being tailored based on recipient-specific criteria so that the accountholder communication system sending the electronic communication is notified about activation of the link by a recipient of the respective electronic communication, the tracking including identification of an account number of the recipient, and wherein each content placeholder includes conditional criteria with which a user can specify which communications variables are to be used in generating dynamic content;

presenting availability of the content placeholders associated with the selected communication scenario;

receiving a selection of a content placeholder from the content placeholders associated with the selected communication scenario, wherein the content placeholder is configured to include content in electronic communications based on a state of a specified communication variable;

generating, based on the received selection of the content placeholder associated with the communication scenario, a mass-communication template including the content placeholder, the mass-communication template including instructions that determine a number of e-mails and identity of the recipients, the mass-communication template configured to be used to generate multiple forms of electronic communication;

accessing the mass-communication template to generate a first electronic communication;

identifying the content placeholder as included in the mass-communication template accessed to generate the first electronic communication;

determining, based on the identified content placeholder, that the communication variable is in a first state;

including first content in the first electronic communication based on the determination that the communication variable is in the first state;

sending the first electronic communication with the first content;

accessing the mass-communication template to generate a second electronic communication;

identifying the content placeholder as included in the mass-communication template accessed to generate the second electronic communication;

determining, based on the identified content placeholder, that the communication variable is in a second state;

including second content in the second electronic communication based on the determination that the communication variable is in the second state; and sending the second electronic communication with the second content.

13. The system of claim 12 wherein receiving the selection of the communication scenario includes receiving input from a user through a graphical user interface to select one of multiple present communications scenarios presented to the user.

14. The system of claim 12 wherein presenting availability of the content placeholders associated with the selected communication scenario includes presenting availability of one or more content placeholders which are not associated with other communication scenarios.

15. The system of claim 12 wherein the selected content placeholder includes instructions for including a greeting which is customized for the selected communication scenario in generated electronic communications.

16. The system of claim 12 further comprising instructions for accessing a database to determine the state of the communication variable.

17. The system of claim 16 wherein:
the communications variable is an account number of the intended recipient of the electronic communication;
accessing the database to determine the state of the communication variable includes accessing the database to determine the account number of the intended recipient; and
the first content is a first account number and the second content is a second account number.

18. The system of claim 12 further comprising instructions for:
receiving a selection of a second content placeholder from the content placeholders associated with the selected communication scenario,
wherein the second content placeholder is configured to conditionally include third content in electronic communications based on a state of a second specified communication variable,
wherein the generated mass-communication template includes the second content placeholder.

19. The system of claim 18 further comprising instructions for:
identifying the second content placeholder as included in the mass-communication template accessed to generate the first electronic communication;
determining, based on the second content placeholder, that the second communication variable is in a first state; and
including third content in the first electronic communication based on the determination that the second communication variable is in the first state,
wherein sending the first electronic communication includes sending the first electronic communication with the first and the third content.

20. The system of claim 19 further comprising instructions for:
identifying the second content placeholder as included in the mass-communication template accessed to generate the second electronic communication;
determining, based on the second content placeholder, that the second communication variable is in a second state; and
determining not to include third content in the second electronic communication based on the determination that the second communication variable is in the second state.

* * * * *